United States Patent
Yoshiura et al.

(10) Patent No.: US 7,716,432 B2
(45) Date of Patent: May 11, 2010

(54) DATA PROCESSING APPARATUS AND IMAGE FORMING APPARATUS FOR MANAGING A DATA DELETION HISTORY

(75) Inventors: Syouichirou Yoshiura, Ikoma-gun (JP); Hideo Matsuda, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 401 days.

(21) Appl. No.: 11/113,376

(22) Filed: Apr. 21, 2005

(65) Prior Publication Data

US 2005/0237563 A1    Oct. 27, 2005

(30) Foreign Application Priority Data

Apr. 21, 2004    (JP)    ............... 2004-125978

(51) Int. Cl.
G06F 12/14    (2006.01)
G06F 15/00    (2006.01)

(52) U.S. Cl. ................ 711/156; 358/1.16; 358/1.14; 711/E12.091

(58) Field of Classification Search .............. None
See application file for complete search history.

(56) References Cited

U.S. PATENT DOCUMENTS 6,070,174 A * 5/2000 Starek et al. ............... 707/206

2001/0029521 A1 * 10/2001 Matsuda et al. ............. 709/201
2003/0079078 A1 * 4/2003 Zipprich et al. ............. 711/112
2004/0027603 A1    2/2004 Ueda et al.

FOREIGN PATENT DOCUMENTS

| JP | 06-070079 | 3/1994 |
|----|-----------|--------|
| JP | 09-284572 | 10/1997 |
| JP | 10-112767 | 4/1998 |
| JP | 11-353137 | 12/1999 |
| JP | 2000-261631 | 9/2000 |
| JP | 2002-7095 | 1/2002 |
| JP | 2002-142089 | 5/2002 |
| JP | 2002-178566 | 6/2002 |
| JP | 2003-37719 | 2/2003 |
| JP | 2003-101739 | 4/2003 |
| JP | 2003-242037 | 8/2003 |
| JP | 2004072139 | 3/2004 |

* cited by examiner

Primary Examiner—Reginald G Bragdon
Assistant Examiner—Eric Loonan
(74) Attorney, Agent, or Firm—David G. Conlin; Steven M. Jensen; Edwards Angell Palmer & Dodge LLP

(57) ABSTRACT

The present invention includes means for processing received data, storage means for storing the data, means for performing an invalidation process on the data stored in the storage means, and means for storing history information about the history of the invalidation process performed.

12 Claims, 16 Drawing Sheets

FIG. 10

| DATE | TIME | DELETION INSTRUCTION | AREA SUBJECTED TO DELETION | SUTATUS | NUMBER OF TIMES DELETED |
|---|---|---|---|---|---|
| 2004.1.30 | 8:07 | POWER ON | ALL AREAS | DELETION COMPLETED | 3 TIMES |
| 2004.1.30 | 12:00 | PROGRAM | WORK AREA | DELETION COMPLETED | 1 TIME |
| 2004.1.30 | 14:17 | MANUALLY | WORK AREA | DELETION COMPLETED | 1 TIME |
| 2004.2.2 | 8:12 | POWER ON | ALL AREAS | DELETION COMPLETED | 3 TIMES |
| 2004.2.2 | 11:30 | MANUALLY | FILING AREA | DELETION COMPLETED | 1 TIME |
| 2004.2.2 | 12:00 | PROGRAM | WORK AREA | DELETION COMPLETED | 1 TIME |
| ⋮ | ⋮ | ⋮ | ⋮ | ⋮ | ⋮ |

FIG. 12

| | | | | | | |
|---|---|---|---|---|---|---|
| 2004.1.30 | 8:07 | POWER ON | ALL AREAS | DELETION COMPLETED | 3 TIMES | |
| 2004.1.30 | 12:00 | PROGRAM | WORK AREAS | DELETION COMPLETED | 1 TIME | |
| 2004.1.30 | 14:17 | MANUALLY | WORK AREAS | DELETION COMPLETED | 1 TIME | |

HD DATA DELETION HISTORY — OK 180, 181a, 181b, 181c, 180u, 180d, 180e (DELETE), 180f (PRINT), 180g (CERTIFICATE)

FIG. 14

| HD DATA DELETION HISTORY | | | | 2004.2.xx xx:xx<br>AR-xxxx<br>SERIAL No. xxxAxxx | |
|---|---|---|---|---|---|
| DELETION HISTORY INFORMATION | | | | | |
| 2004.1.30 | 8:07 | POWER ON | ALL AREAS | DELETION COMPLETED | 3 TIMES |
| 2004.1.30 | 12:00 | PROGRAM | WORK AREA | DELETION COMPLETED | 1 TIME |
| 2004.1.30 | 14:17 | MANUALLY | WORK AREA | DELETION COMPLETED | 1 TIME |
| 2004.2.2 | 8:12 | POWER ON | ALL AREAS | DELETION COMPLETED | 3 TIMES |
| 2004.2.2 | 11:30 | MANUALLY | FILING AREA | DELETION COMPLETED | 1 TIME |
| 2004.2.2 | 12:00 | PROGRAM | WORK AREA | DELETION COMPLETED | 1 TIME |
| | | | | | |
| | | | | | |
| | | | | | |

MARK

FIG. 15

```
HD DATA DELETION HISTORY    2004.2.xx
 (AR-xxxx) SERIAL No.xxxAxxx

IT IS CERTIFIED THAT THE DATA
IN THE WORK AREA WAS DELETED ON
1.30.2004;14:17.

MARK
```

FIG. 16

```
HD DATA DELETION HISTORY    2004.2.xx
(AR-xxxx) SERIAL No. xxxAxxx

IT IS CERTIFIED THAT ALL DATA
IN THE HARD DISK WAS DELETED ON
2.2.2004:8:12.

MARK
```

DATA PROCESSING APPARATUS AND IMAGE FORMING APPARATUS FOR MANAGING A DATA DELETION HISTORY

CROSS-REFERENCE TO RELATED APPLICATION

This non-provisional application claims priority under 35 U.S.C. §119(a) on Patent Application No. 2004-125978 filed in Japan on Apr. 21, 2004, the entire contents of which are hereby incorporated by reference.

BACKGROUND OF THE INVENTION

1. Field of the Invention

The present invention relates to a data processing apparatus and an image forming apparatus that manage a data deletion history.

2. Description of Related Art

Image forming apparatuses, such as a digital multi-function apparatus that processes electronic data of a document by temporarily storing it in the storage section in the apparatus have been commercialized. A digital multi-function apparatus comprises a scanner unit for reading an image of a document and a printer unit for forming an image on paper, and has a plurality of functions, such as a copy function, facsimile function, scanner function and print function. Such a digital multi-function apparatus proposes the users to improve the operating efficiency and processing ability by positioning it as a data processing apparatus for efficiently processing data inputted from a plurality of interfaces on communication networks. Moreover, in a digital multi-function apparatus, a large-capacity storage device such as a hard disk is installed to enable input of various data and parallel processing of these data, and thus it is possible to receive a plurality of requests for data processing and process the data one after another.

In the storage device such as a hard disk, the data is written and is held temporarily for processing. After finishing the processing, when new data is inputted, the new data is received by deleting the already processed data by overwriting it. In this structure, since the processed data is left as it is in the device until new data is written, there is a problem in terms of data protection. Then, in recent years, in order to solve the problem associated with data remaining in the device, an apparatus that invalidates the processed data by deleting the data by itself was proposed (for example, Japanese Patent Application Laid-Open No. 09-284572).

Thus, in a conventional digital multi-function apparatus, the apparatus automatically deletes the processed data by itself to prevent leakage of information. However, since the processed data is automatically deleted inside the apparatus regardless of the intention of the user, it is difficult for the user to confirm whether the data has been certainly invalidated. In some cases, the digital multi-function apparatus is caused to read and print personal information, and therefore, if the user psychology is taken into consideration, it is preferable to provide information proving that the invalidation process has been certainly performed. However, there is the problem that apparatuses capable of providing such information have not yet been proposed at present.

BRIEF SUMMARY OF THE INVENTION

The present invention has been made with the aim of solving the above problems, and it is an object of the present invention to provide a data processing apparatus and an image forming apparatus, which comprise means for processing received data and storage means for storing the data and are constructed to invalidate the data stored in the storage means and store a history of data invalidation, thereby capable of presenting information indicating and proving that the data has been invalidated.

A data processing apparatus according to the present invention is a data processing apparatus including means for processing received data and storage means for storing the data, and characterized by comprising means for performing an invalidation process on the data stored in the storage means, and means for storing history information about a history of the invalidation process performed.

In the present invention, since the history of the invalidation process performed on the data is stored, it is possible to provide information indicating and proving that the data has been invalidated.

A data processing apparatus according to the present invention is characterized in that the storage means has a plurality of storage areas for storing the received data, and the apparatus comprises means for receiving a selection of a storage area to be subjected to the invalidation process, wherein the invalidation process is performed on the data in the selected storage area.

In the present invention, the storage means has a plurality of storage areas, and the invalidation process can be performed for each storage area. It is therefore possible to divide the storage means into a storage area for working and a storage area for storing, for example, and it is possible to propose to the users a variety of application modes.

A data processing apparatus according to the present invention is characterized by comprising means for receiving a condition for performing the invalidation process, and means for determining whether or not the received condition is satisfied, wherein the invalidation process is performed on the data, when the means determines that the condition is satisfied.

In the present invention, the data processing apparatus receives a condition for performing the invalidation process, and performs the invalidation process when it determines that the condition is satisfied. Therefore, the data processing apparatus operates according to the condition, such as the executing time and a request for authenticating the user.

A data processing apparatus according to the present invention is characterized by comprising means for outputting time information, and means for determining, based on the time information outputted by the means, whether it is a predetermined time or not, wherein when the means determines that it is the predetermined time, the invalidation process is performed on the data.

In the present invention, data invalidation is performed at a predetermined time. Therefore, by performing data invalidation in a time range in which the frequency the apparatus is used is low, the possibility of executing processing of the received data and the invalidation process on the data stored in the storage means at the same time is low, thereby preventing a delay in processing.

A data processing apparatus according to the present invention is characterized by comprising means for generating information proving the propriety of the history information, and means for outputting the generated information.

In the present invention, information proving the propriety of the history information is generated, and the generated information is outputted. It is therefore possible to prove that the invalidation process on the data has certainly been executed.

A data processing apparatus according to the present invention is characterized by comprising means for outputting the history information as a list.

In the present invention, since the history information is outputted as a list, the history of the invalidation process performed on data is provided as information.

A data processing apparatus according to the present invention is characterized by comprising: means for receiving an instruction to delete the history information; means for receiving identification information identifying a user when the instruction is received; means for authenticating the user based on the received identification information; means for deciding whether or not to delete the history information, based on a result of authentication performed by the means; and means for deleting the history information when the means decides to delete the history information.

In the present invention, when deleting the history information, identification information identifying the user is received, authentication of the user is performed based on the received identification information, and deletion is performed after determining whether or not it is possible to delete the history information. Therefore, since the history information will never be deleted by third parties other than a specific person such as an apparatus manager, the reliability of the history information managed in the data processing apparatus is improved.

An image forming apparatus according to the present invention is an image forming apparatus including means for forming an image on a sheet based on received image data and storage means for storing the image data, and characterized by comprising means for performing an invalidation process on the image data stored in the storage means, and means for storing history information about a history of the invalidation process performed.

In the present invention, since the history of the invalidation process performed on the image data is stored, it is possible to provide information indicating and proving that the image data has been invalidated.

In the present invention, since the history of the invalidation process performed on the data is stored, it is possible to provide information indicating and proving that the data has been invalidated.

In the present invention, the storage means has a plurality of storage areas, and the invalidation process can be performed for each storage area. Therefore, it is possible to divide the storage means into a storage area for working and a storage area for storing, for example, and it is possible to propose to the users a variety of application modes. Moreover, since it just needs to delete the data in a necessary storage area, it is possible to shorten the time taken for the deletion process.

In the present invention, the data processing apparatus receives a condition for performing the invalidation process, and performs the invalidation process when it determines that the condition is satisfied. It is therefore possible to operate the data processing apparatus according to the condition, such as the executing time and a request for authenticating the user.

In the present invention, data invalidation is performed at a predetermined time. Therefore, by performing data invalidation in a time range in which the frequency the apparatus is used is low, the possibility of executing processing of the received data and the invalidation process on the data stored in the storage means at the same time is low, thereby improving the processing efficiency.

In the present invention, information proving the propriety of the history information is generated, and the generated information is outputted. It is therefore possible to prove that the invalidation process on the data has certainly been executed.

In the present invention, since the history information is outputted as a list, it is possible to provide the history of the invalidation process performed on the data as information.

In the present invention, when deleting the history information, identification information for identifying the user is received, authentication of the user is performed based on the received identification information, and deletion is performed after determining whether or not it is valid to delete the history information. Therefore, since the history information will never be deleted by third parties other than a specific person such as an apparatus manager, it is possible to improve the reliability of the history information managed in the data processing apparatus.

In the present invention, since the history of the invalidation process performed on the image data is stored, it is possible to provide information indicating and proving that the image data has been invalidated.

The above and further objects and features of the invention will more fully be apparent from the following detailed description with accompanying drawings.

BRIEF DESCRIPTION OF THE SEVERAL VIEWS OF THE DRAWINGS

FIG. 9 is a flowchart explaining the steps of a process to be executed by the multi-function apparatus when power is turned on;

FIG. 10 is a concept view showing an example of a deletion history management table;

FIG. 12 is a schematic view showing an example of a deletion history display screen;

FIG. 14 is a schematic view showing an output example of a deletion history;

FIG. 15 is a schematic view showing an example of a certificate issued by the multi-function apparatus; and FIG. 16 is a schematic view showing an example of a certificate issued by the multi-function apparatus.

DETAILED DESCRIPTION OF THE INVENTION

Figure 1:
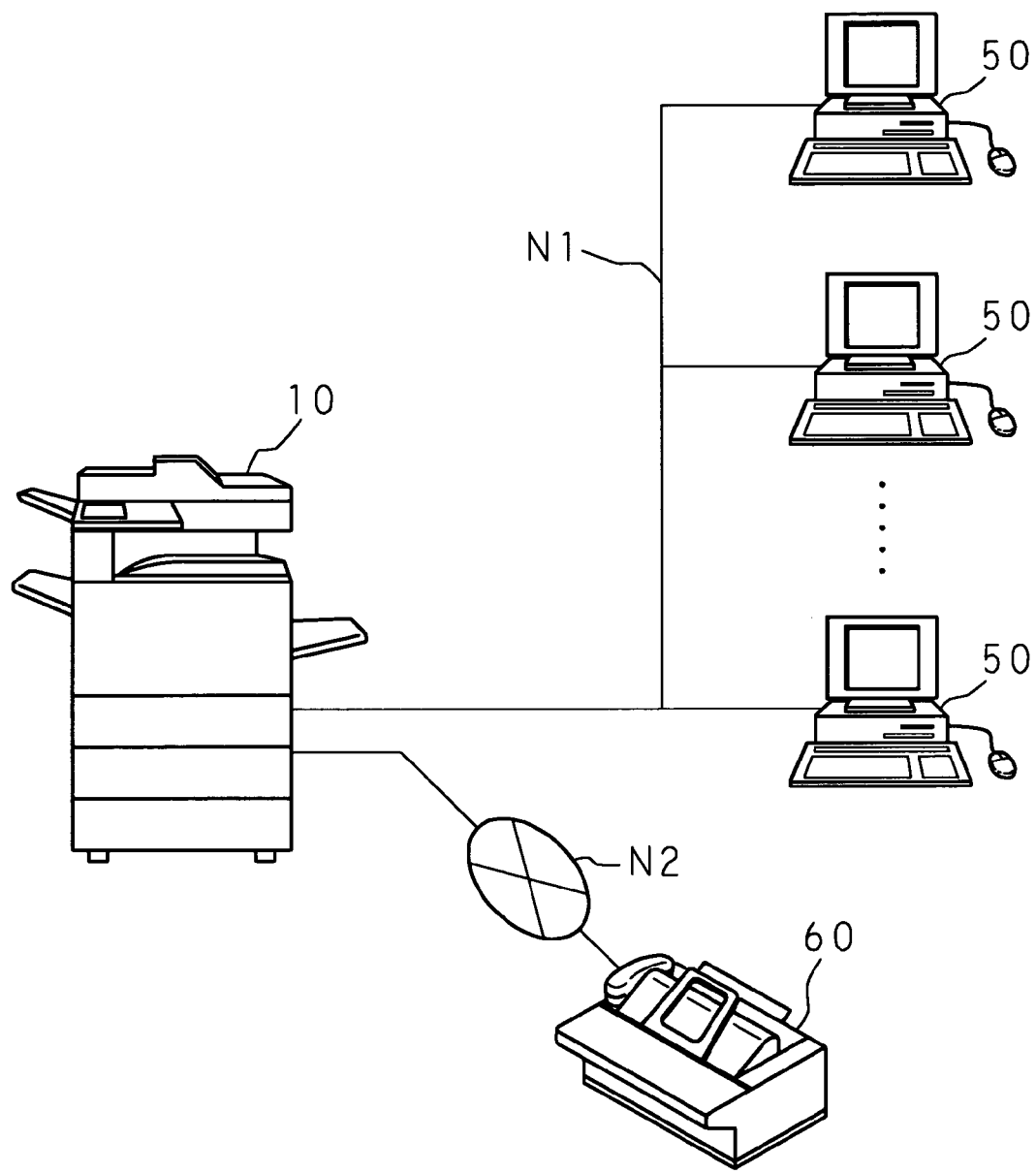
FIG. 1 is a schematic block diagram for explaining a system built by a multi-function apparatus according to an embodiment.

Referring to the drawings, the following description will specifically explain an embodiment in which a data processing apparatus and an image forming apparatus of the present invention are applied to a multi-function apparatus having a print function, copy function, facsimile function, document filing function, etc.

FIG. 1 is a schematic block diagram for explaining a system built by a multi-function apparatus of this embodiment. In FIG. 1, the reference numeral 10 represents a multi-function apparatus of this embodiment, and the multi-function apparatus 10 is connected with information processors 50, 50, . . . , 50 such as personal computers through a communication network N1 and is also connected with a facsimile machine 60 through a public telephone network N2. In the information processors 50, application programs for creating data such as documents and graphics, and a driver program (printer driver) for using the multi-function apparatus 10 through the communication network N1 are installed in advance. By calling the printer driver from an arbitrary program and transmitting a print job created by the printer driver to the multi-function apparatus 10, it is possible to execute a print process. Moreover, the multi-function apparatus 10 comprises means for encoding or decoding facsimile data transmitted or received through the public telephone network N2, and transmits the coded facsimile data to the facsimile machine 60, and after receiving the facsimile data transmitted from the facsimile machine 60, executes a print process based on image data obtained by decoding the facsimile data.

Further, the multi-function apparatus 10 has a document filing function, and can store image data extracted from the received print job, image data obtained by a later-described image reading section, etc. in non-volatile storage means, and can read and output the image data from the storage means if necessary. In other words, by accessing the multi-function apparatus 10 from the information processors 50, 50, . . . , 50 via the communication network N1, it is possible to use the multi-function apparatus 10 as a server of image data.

Figure 2:
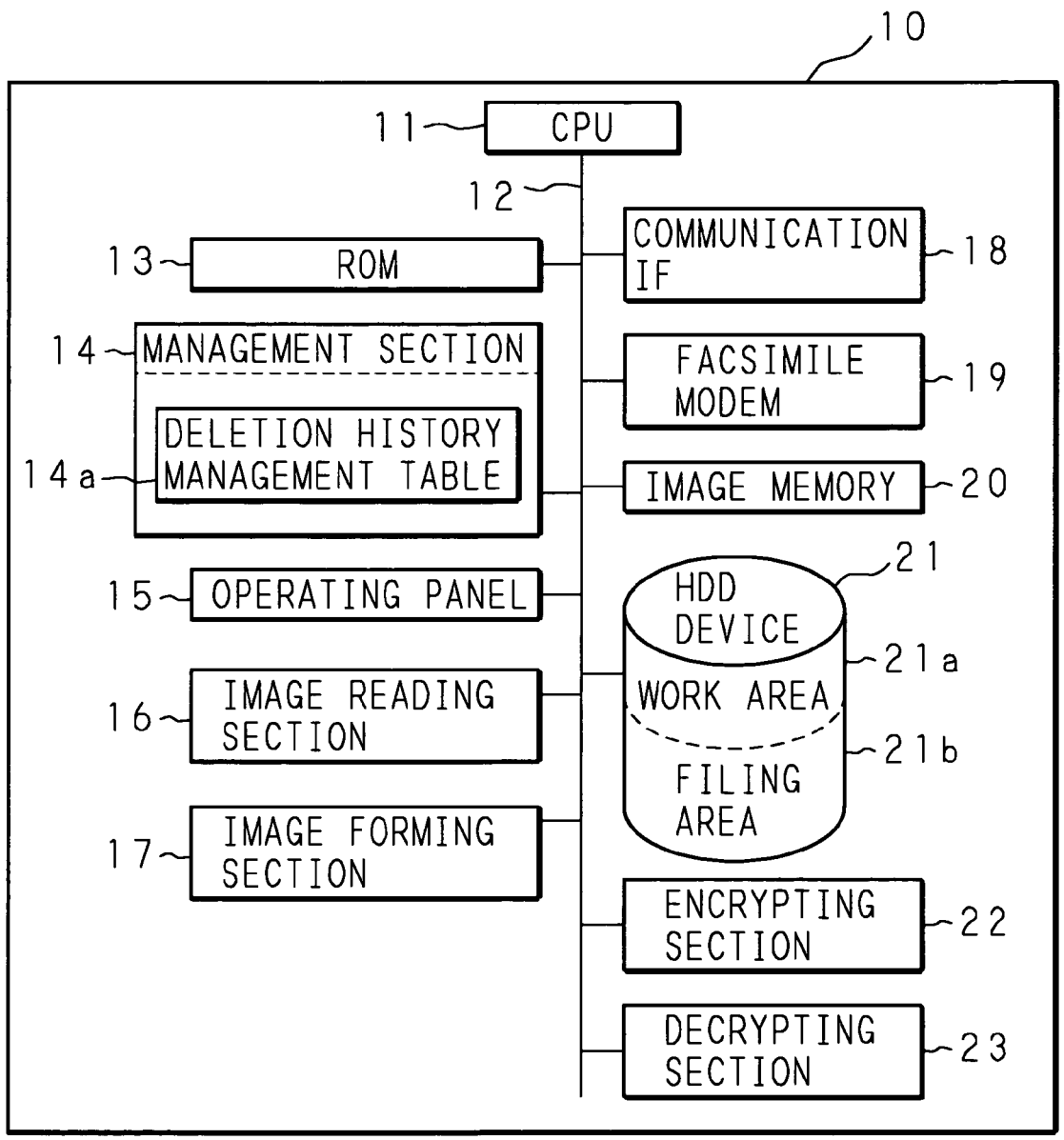
FIG. 2 is a block diagram for explaining the structure of the control system of the multi-function apparatus.

FIG. 2 is a block diagram for explaining the structure of the control system of the multi-function apparatus 10. The multi-function apparatus 10 comprises a CPU 11. When the CPU 11 reads and executes a control program pre-stored in a ROM 13, it controls various hardware devices connected through a bus 12, and causes them to operate as a data processing apparatus and an image forming apparatus of the present invention as a whole. A management section 14 (storage section) is composed of a non-volatile semiconductor memory, and part of its storage area is used as a deletion history management table 14a. In the deletion history management table 14a which will be described in detail later, history information obtained when deleting data stored in a HDD device 21 is managed.

Figure 3:
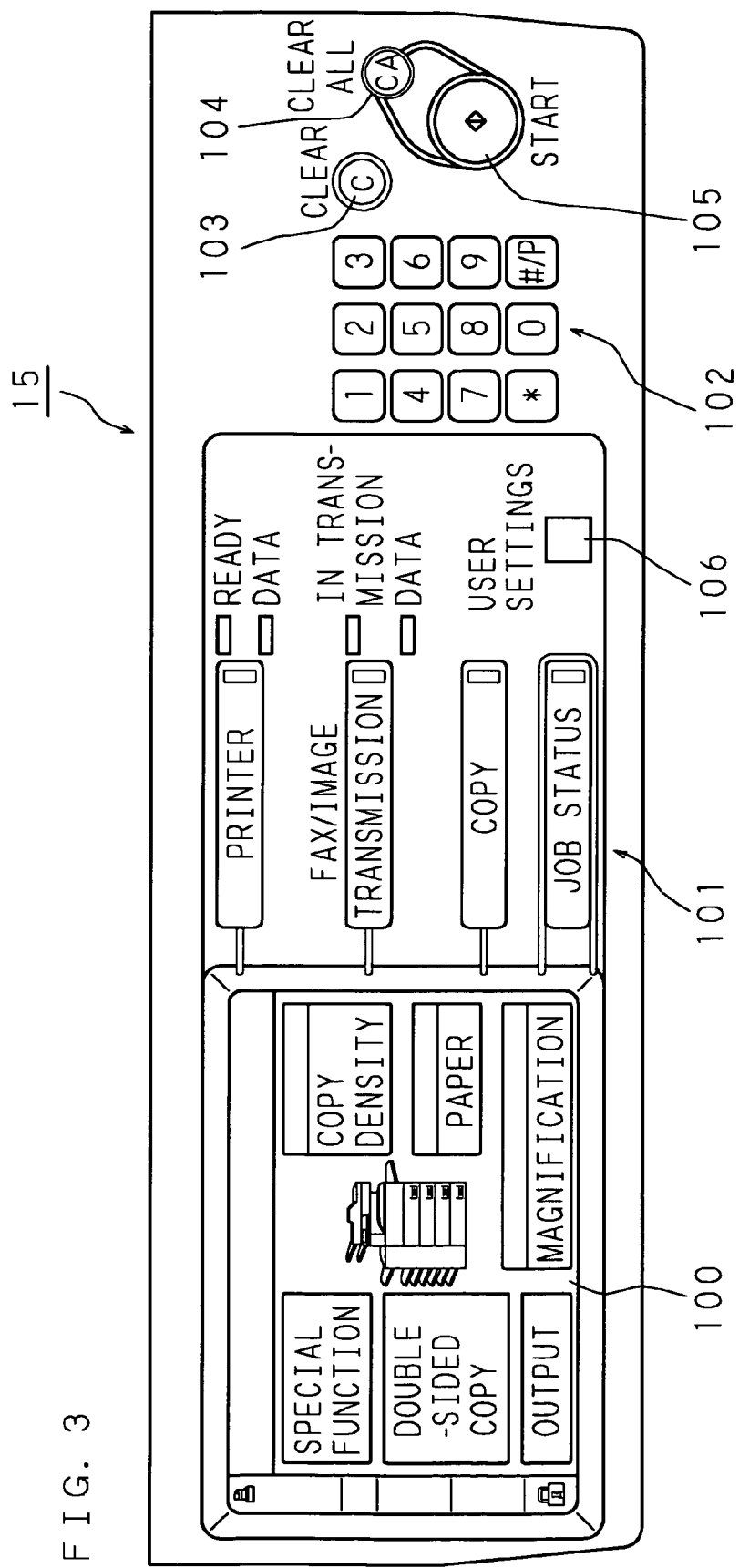
FIG. 3 is a schematic view showing the appearance of an operating panel.

An operating panel 15 is composed of an operating section for receiving operating instructions from a user, and a display section for displaying information to be notified to the user (see FIG. 3). The operating section has various operation keys for receiving operating instructions from the user, and receives user's instructions such as the setting values for the respective functions, such as the number of copies to be printed, the copy density and the destination of facsimile data, a function switching operation, and an output start instruction. The display section includes a liquid crystal display, and displays the operating status of the multi-function apparatus 10, various kinds of setting values inputted through the operating section, information to be notified to the user, and so on. Further, part of the display section includes touch-panel type software keys constructed to receive various types of selecting operations.

An image reading section 16 comprises a light source for emitting light to a document to be read; an image sensor such as a CCD (Charge Coupled Device); an AD converter (not shown), etc., and focuses an image of a document set in a predetermined read position onto the image sensor, converts the image into an analog electric signal, and converts the obtained analog signal into a digital signal by the AD converter. Then, the image reading section 16 generates digital image data by correcting the luminous intensity distribution characteristic of the light source when reading the document, the variation in the sensitivity of the image sensor, etc. for the digital signals obtained by AD conversion.

An image forming section 17 comprises, for example, a charger for charging a photosensitive drum to a predetermined electric potential; a laser write device for generating an electrostatic latent image on the photosensitive drum by emitting laser light according to the image data received from an external device; a developing device for developing the image by supplying toner to the electrostatic latent image formed on the photosensitive drum surface; and a transfer device (not shown) for transferring the toner image formed on the photosensitive drum surface to paper, a sheet of OHP film or the like. The image forming section 17 can form an image desired by the user on paper by using an electrophotographic technique.

In this embodiment, although the image forming section 17 forms an image by the electrophotographic technique using the laser write device, it is, of course, possible to form an image by using an ink jet technique, a heat transfer technique, or a sublimation technique.

A communication IF 18 comprises a communication interface according to the communication standards of communication network N1, receives print jobs from the information processors 50, 50, . . . , 50 connected to the communication network N1, and transmits information to be notified to the information processors 50, 50, . . . , 50. The communication IF 18 controls such transmission and reception of various types of data.

A facsimile modem 19 comprises a line termination circuit for connecting the facsimile machine 60, and performs transmission and reception of facsimile data through the public telephone network N2. Therefore, the facsimile modem 19 comprises a decoding circuit for decoding the received facsimile data, and transfers image data obtained by decoding to an image memory 20. Moreover, the facsimile modem 19 comprises an encoding circuit for encoding facsimile data to be transmitted, and transmits the facsimile data coded by the encoding circuit to a target facsimile machine 60. The facsimile modem 19 executes such transmission and reception of facsimile data, and the process of encoding/decoding the facsimile data.

The image memory 20 is composed of a semiconductor memory, and temporarily stores image data generated by reading an image on a document by the image reading section 16, image data developed from a print job, and image data developed from facsimile data. According to an instruction from the CPU 11, the image data stored temporarily in the image memory 20 is transferred to a transfer location corresponding to the purpose of use. In short, when forming an image on paper, the image data is transferred to the image forming section 17; when transmitting the image data as facsimile data, it is transferred to the facsimile modem 19; and when storing the image data by using the document filing function, it is transferred to the HDD device 21.

The HDD device 21 (storage section) comprises a magnetic recording medium in the form of a disk, and part of its storage area is used as a data area for storing image data. etc. When a request is received through the operating panel 15, or when a request from an information processor 50 is received through the communication IF 18, the image data stored in the data area is read. Thus, if there is a need to perform the print process again due to a failure of printing or a shortage of the number of copies outputted, it is possible to execute the print process by arbitrarily reading the image data stored in the data area. This data area is divided into a work area 21a and a filing area 21b, and the capacity of the work area 21a is set smaller compared to that of the filing area 21b. Therefore, the work area 21a is mainly used as an area for temporarily holding the data being used, and when the available space of the work area 21a becomes smaller, data which has been stored in the work area 21a for a period of time exceeding a predetermined length of time is automatically stored in the filing area 21b. On the other hand, the filing area 21b is an area for storing data by sorting the data according to each file format, each processing mode such as the printer function, scanner function, copy function and facsimile function, or each folder created by the user, and holds the data unless instructions such as a deletion instruction is given.

Moreover, the multi-function apparatus 10 of this embodiment is able to store data in the HDD device 21 after encrypting the data. Therefore, the multi-function apparatus 10 comprises an encrypting section 22 for encrypting data, and a decrypting section 23 for decrypting data when reading the data stored in an encrypted form. Note that data encryption may be executed only when it is instructed by the user, or an encryption process may be performed on all data to be stored in the filing area 21b of the HDD device 21.

The encrypting section 22 comprises an input buffer for inputting data to be encrypted; a processor for performing arithmetic processing using a predetermined encryption algorithm on the data set in the input buffer; and an output buffer for holding the result of processing performed by the processor. As the encryption algorithm, it is possible to use an AED (Advanced Encryption Standard), for example. Data to be encrypted is inputted to the input buffer, and the processor performs processing by reading the input data set in the input buffer, and writes the processing result into the output buffer when the processing has been completed. By fetching the processed data from the output buffer, the CPU 11 of the multi-function apparatus 10 obtains the data encrypted by the encrypting section 22.

The decrypting section 23 has basically the same structure as the encrypting section 22, and comprises an input buffer for inputting data to be decrypted; a processor for performing arithmetic processing using a predetermined decryption algorithm on the data set in the input buffer; and an output buffer for holding the result of processing performed by the processor. Data to be decrypted is inputted to the input buffer, and the processor performs processing by fetching the input data set in the input buffer and writes the processing result to the output buffer when the processing has been completed. By fetching the processed data from the output buffer, the CPU 11 of the multi-function apparatus 10 obtains the data decrypted by the decrypting section 23.

In this embodiment, the data stored in the HDD device 21 can be deleted when the power of the multi-function apparatus 10 is turned on, or at a time specified by the user, or according to the user's instruction, and the settings relating to such a data deletion process are made through the operating panel 15. FIG. 3 is a schematic view showing the appearance of the operating panel 15. The operating panel 15 comprises a display section 100 composed of a liquid crystal display and a touch panel; and an operating section having various hardware keys. The hardware keys of the operating section includes function switching keys 101 for switching the respective functions such as the printer function, transmission function, and copy function; a ten-key 102 for inputting numerical values, a Clear key 103 for clearing the various kinds of setting values inputted, a Clear All key 104 for clearing all the various kinds of setting values inputted, a Start key 105 for instructing to start copying, and a User Settings key 106 for receiving settings from a user.

Figure 4A:
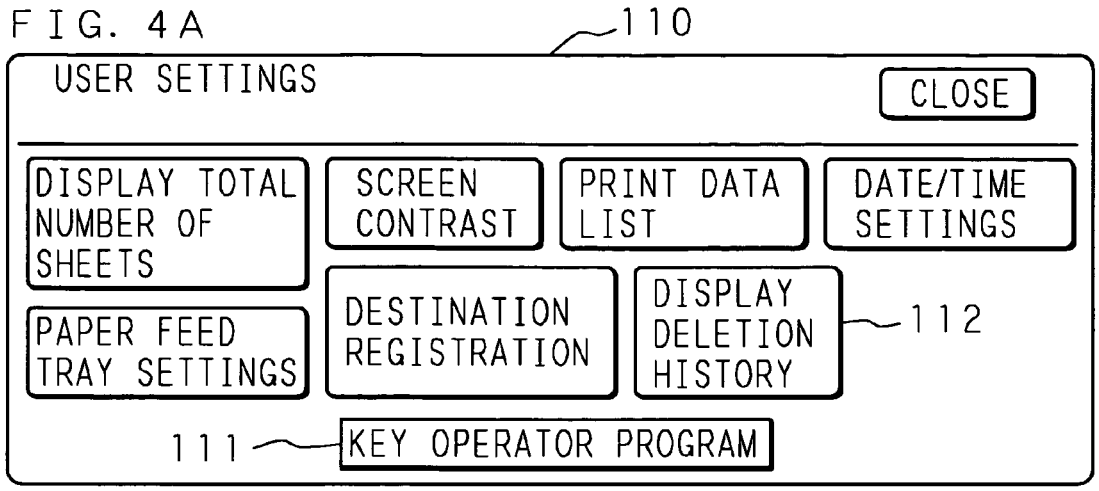
FIGS. 4A-4C are schematic views showing examples of screens displayed in the display section of the operating panel.

Referring to examples of screens displayed in the display section 100 of the operating panel 15, the following description will explain the operation performed when receiving settings relating to a data deletion process. FIGS. 4A through 8C are schematic views showing examples of screens displayed in the display section 100 of the operating panel 15. When the User Settings key 106 of the operating panel 15 is pressed, a user settings screen 110 as shown in FIG. 4A is displayed in the display section 100 of the operating panel 15. On the user settings screen 110, by operating various kinds of setting buttons arranged as software keys, it is possible to display the total number of printed outputs, set the screen contrast, receive printed outputs of various types of data lists, set a date and time, set a paper feed tray, register a destination to which data is to be transmitted, display the data deletion history, etc.

Figure 4B:
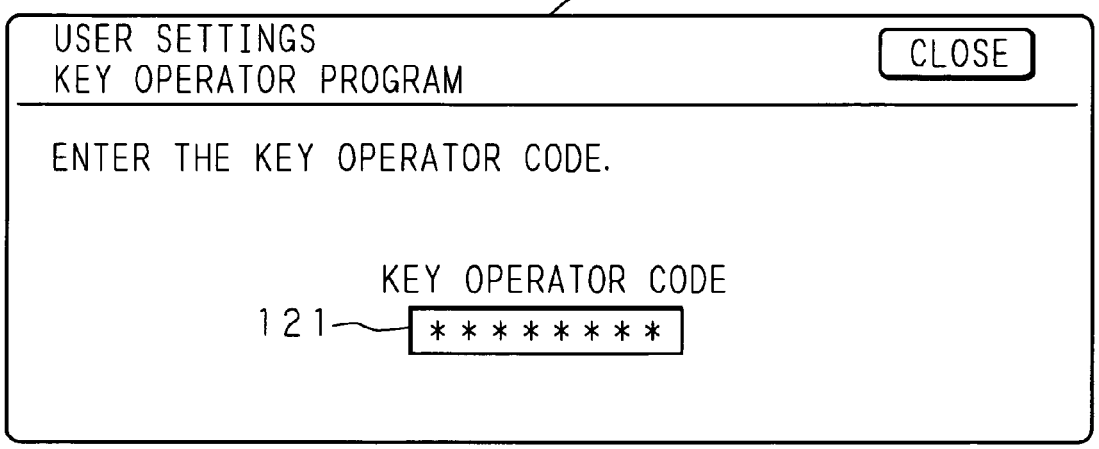

When a Key Operator Program button 111 located in the lower area of the user settings screen 110 is pressed, as shown in FIG. 4B, a code reception screen 120 for receiving input of a key operator code (for example, 8-digit numerical value) is displayed in the display section 100 of the operating panel 15. In the vicinity of the center of the code reception screen 120, a code input box 121 is arranged. When a code is inputted into the code input box 121 by using the ten-key 102, a judgment is made as to whether or not the inputted code and a preset key operator code match.

Figure 4C:
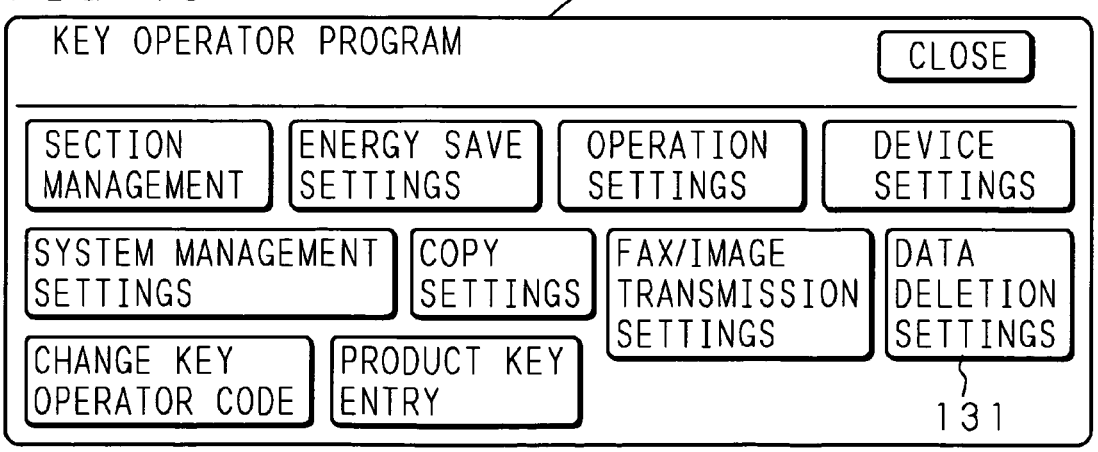

If the judgment is made that the code inputted into the code input box 121 and the preset key operator code match, a key operator program screen 130 as shown in FIG. 4C is displayed in the display section 100 of the operating panel 15. In the key operator program screen 130, various kinds of setting buttons are provided for the section management settings, energy save settings, operation settings, device settings, system management settings, copy settings, fax/image transmission settings, data deletion settings, reception of key operator code change, and entry of a product key. In other words, the items whose settings can be changed only by a person provided with the key operator code in advance (for example, the apparatus manager of the multi-function apparatus 10) are displayed on the key operator program screen 130.

Figure 5:
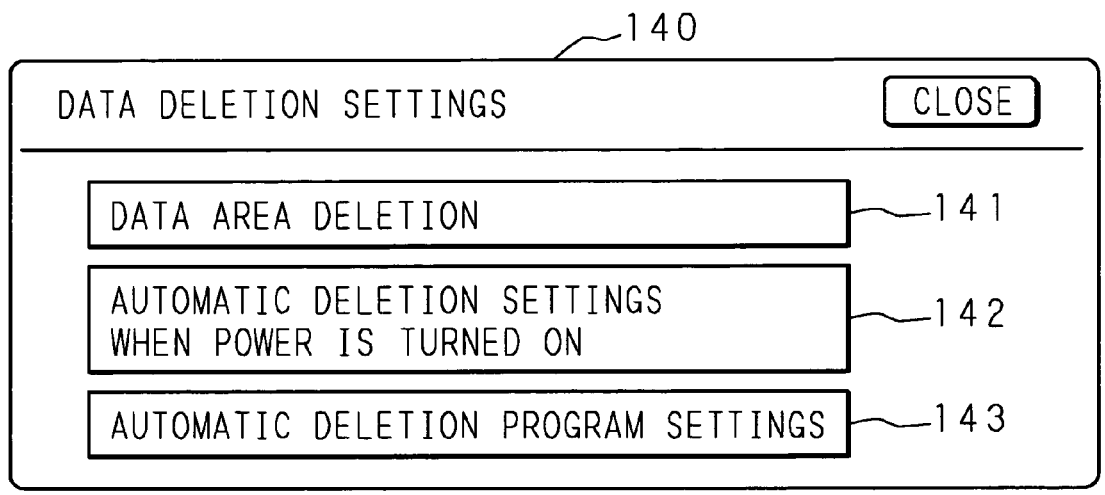
FIG. 5 is a schematic view showing an example of a screen displayed in the display section of the operating panel.

When a Data Deletion Settings button 131 is pressed among various kinds of setting buttons arranged on the key operator program screen 130, a data deletion settings screen 140 as shown in FIG. 5 is displayed in the display section 100 of the operating panel 15. On the data deletion settings screen 140, a Data Area Deletion button 141 for manually deleting the data stored in the data area (work area 21a and filing area 21b) in the HDD device 21, an Automatic Deletion Settings button 142 for enabling automatic deletion when power is turned on, and a Program Settings button 143 for setting a time to perform data deletion are arranged.

Figure 6A:
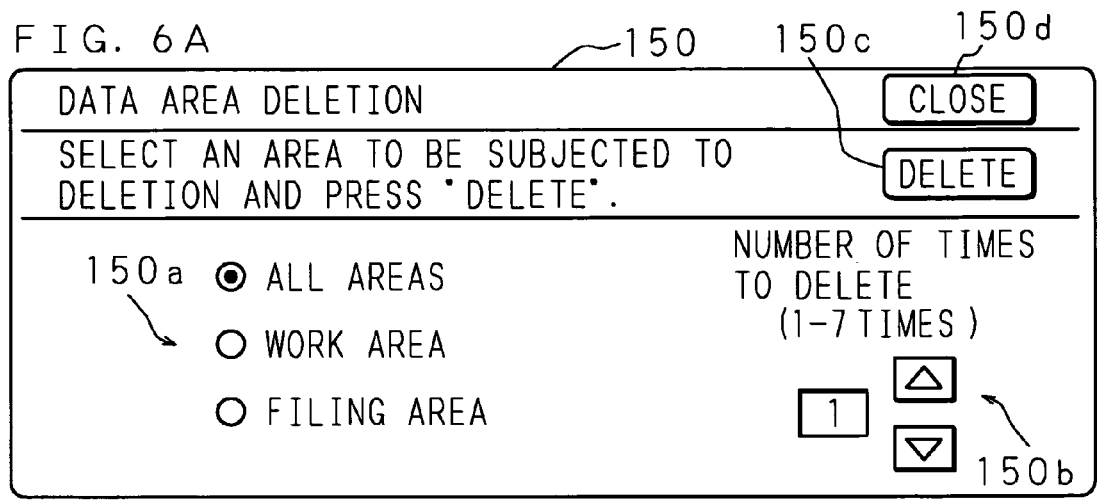
FIGS. 6A-6C are schematic views showing examples of screens displayed in the display section of the operating panel.
Figure 6B:
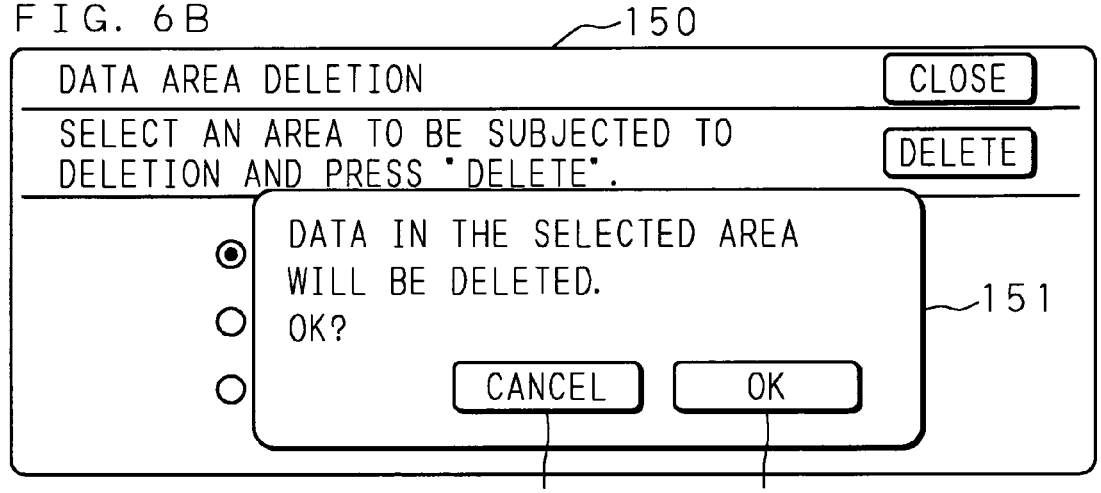
Figure 6C:
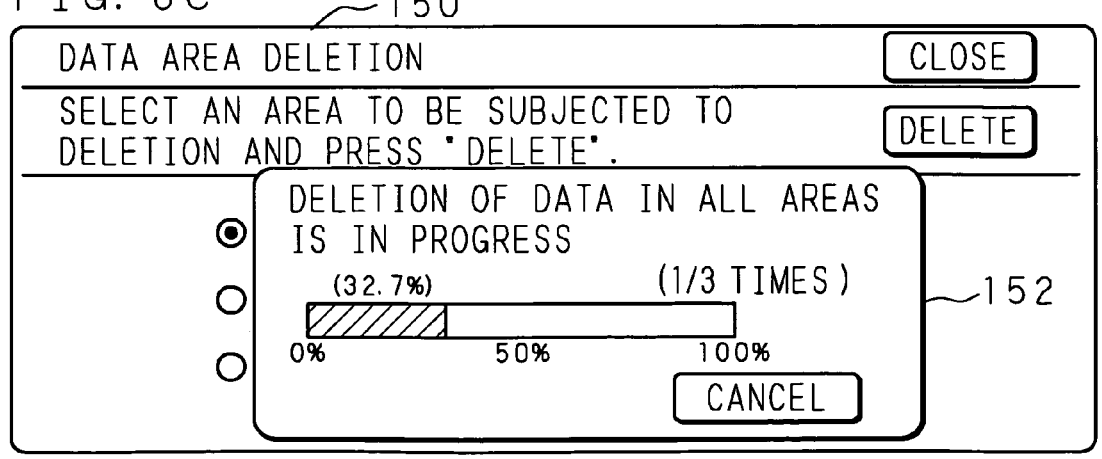

On the data deletion settings screen 140, when the Data Area Deletion button 141 is pressed, a data area deletion screen 150 as shown in FIGS. 6A-6C is displayed. On the data area deletion screen 150, an area selecting section 150a for receiving a selection of an area to be subjected to deletion, and a number setting section 150b for setting the number of times deletion is to be executed are arranged. In the area setting section 150a, radio buttons corresponding to all areas (work area 21a and filing area 21b), the work area 21a, and the filing area 21b, respectively, are provided, and an area to be subjected to deletion can be selected by selecting a button from these radio buttons. Moreover, in the number setting section 150b, a button for increasing the number of times deletion is to be executed one by one, and a button for decreasing the number of times deletion is to be executed one by one are arranged. By operating these two buttons, it is possible to set the number of times deletion is to be expected between once and seven times. When a Delete button 150c located at the right end of the data area deletion screen 150 is pressed, data deletion is started after reconfirmation, while when a Close button 150d is pressed, the data area deletion screen 150 is closed without starting data deletion.

On the data area deletion screen 150, when the Delete button 150c is pressed, as shown in FIG. 6B, a confirmation dialog 151 for reconfirmation of data deletion is displayed on the data area deletion screen 150 by overwriting. When a Cancel button 151a located in the lower area of the confirmation dialog 151 is pressed, the execution of the deletion process is cancelled, while when the OK button 151b is pressed, the deletion process is started. When the deletion process is started, as shown in FIG. 6C, a progress checking dialog 152 for checking the progress of the deletion process is displayed. In the progress checking dialog 152, information indicating that the deletion process is in progress is displayed, and also the degree of progress of the process is displayed by numerical values and levels. In the example shown in FIG. 6C, the number of times deletion is to be executed is set to three times, and the deletion process has proceeded to 32.7% of the first deletion. Thus, since the progress is displayed by levels for each time, the time at which the deletion process will be completed can be easily estimated, and it may also be possible to interrupt the deletion process if necessary.

Figure 7A:
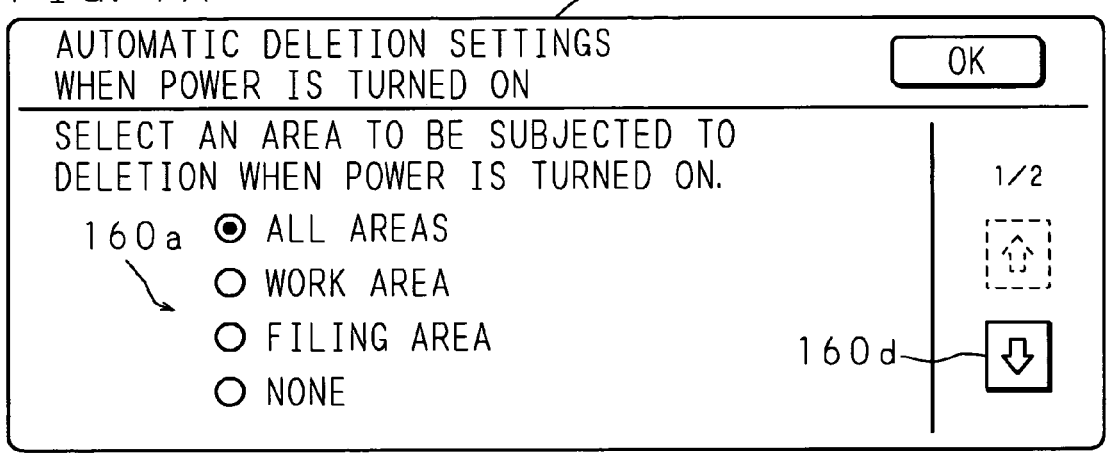
FIGS. 7A and 7B are schematic views showing examples of screens displayed in the display section of the operating panel.

On the other hand, on the data deletion settings screen 140 shown in FIG. 5, when the Automatic Deletion Settings button 142 is pressed, an automatic deletion settings screen 160 shown in FIG. 7A is displayed in the display section 100 of the operating panel 15. On the automatic deletion settings screen 160, an area selecting section 160 for receiving a selection of an area to be subjected to deletion when power is turned on is provided. In the area selecting section 160a, radio buttons corresponding to all areas, the work area 21a and the filing area 21b, respectively, are arranged, and when any one of the areas is selected, it is registered as the area to be subjected to deletion when power is turned on. When none of the areas is selected, that is, when a radio button corresponding to "None" is selected, the setting of not executing the deletion process when power is turned on is registered.

Figure 7B:
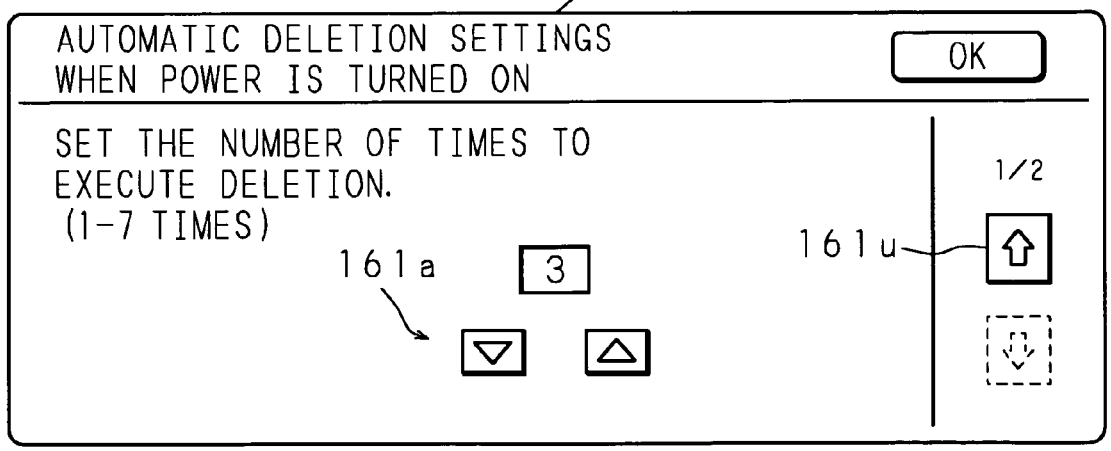

When a page switching button 160d located at the right end of the automatic deletion settings screen 160 is pressed, an automatic deletion settings screen 161 shown in FIG. 7B is displayed. On the automatic deletion settings screen 161, a number setting section 161a is provided for setting the number of times the deletion of data is to be executed when power is turned on. In the number setting section 161a, a button for increasing the number of times deletion is to be executed one by one and a button for decreasing the number of times deletion is to be executed one by one are arranged. By operating these two buttons, it is possible to set the number of times deletion is to be executed between once and seven times. In addition, since a page switching button 161u is provided at the right end of the automatic deletion settings screen 161, the above-described automatic deletion settings screen 160 can be displayed again.

Figure 8A:
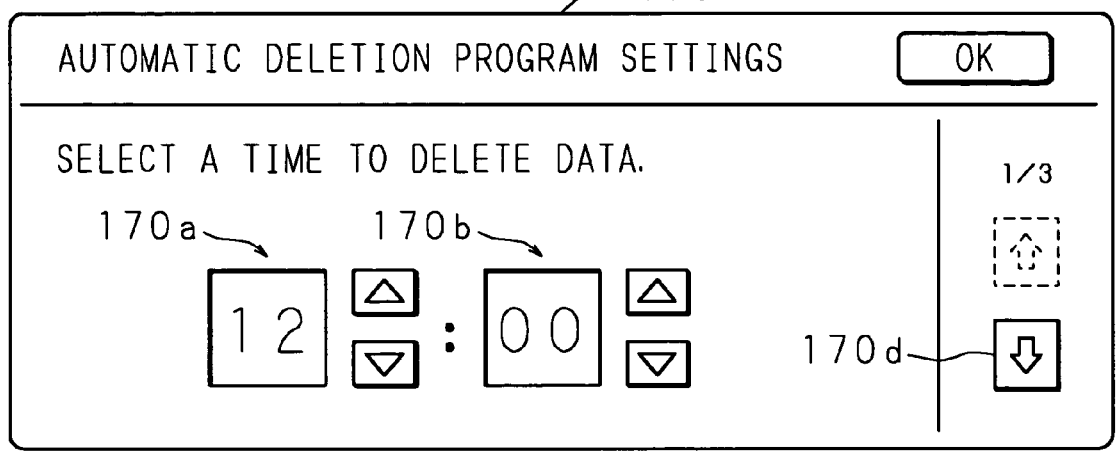
FIGS. 8A-8C are schematic views showing examples of screens displayed in the display section of the operating panel.

Further, on the data deletion settings screen 140 shown in FIG. 5, when the Program Settings button 143 is pressed, a program settings screen 170 shown in FIG. 8A is displayed in the display section 100 of the operating panel 15. On the program settings screen 170, time setting sections 170a and 170b are provided for setting a time (hereinafter referred to as the deletion time) to delete data in the HDD device 21. In the time setting section 170a, buttons for increasing and decreasing the deletion time on an hour-by-hour basis are provided, while in the time setting section 170b, buttons for increasing and decreasing the deletion time on a minute-by-minute basis are provided. By pressing these buttons, the user can set a deletion time.

Figure 8B:
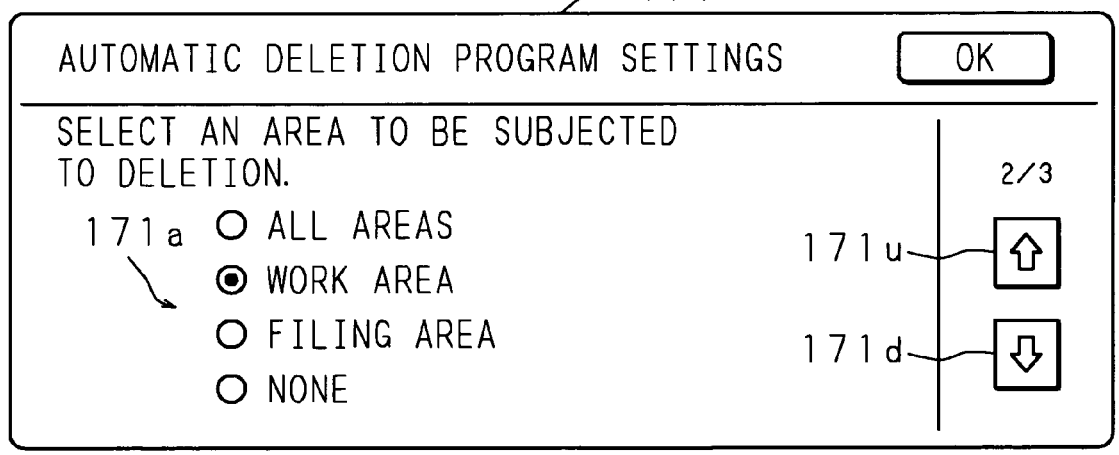

When the page switching button 170d located at the right end of the program settings screen 170 is pressed, a program settings screen 171 shown in FIG. 8B is displayed. On the program settings screen 171, an area selecting section 171a for receiving a selection of an area to be subjected to deletion at the set time is provided. In the area selecting section 171a, radio buttons corresponding to all areas, the work area 21a and the filing area 21b, respectively, are arranged, and when any one of the areas is selected, it is registered as the area to be subjected to deletion at the set time. On the other hand, when none of the areas is selected, that is, when a radio button corresponding to "None" is selected, the setting of not executing the deletion process at the set time is registered. Page switching buttons 171u and 171d are provided at the right end of the program settings screen 171, and when the page switching button 171u is pressed, the above-described program settings screen 170 is displayed again.

Figure 8C:
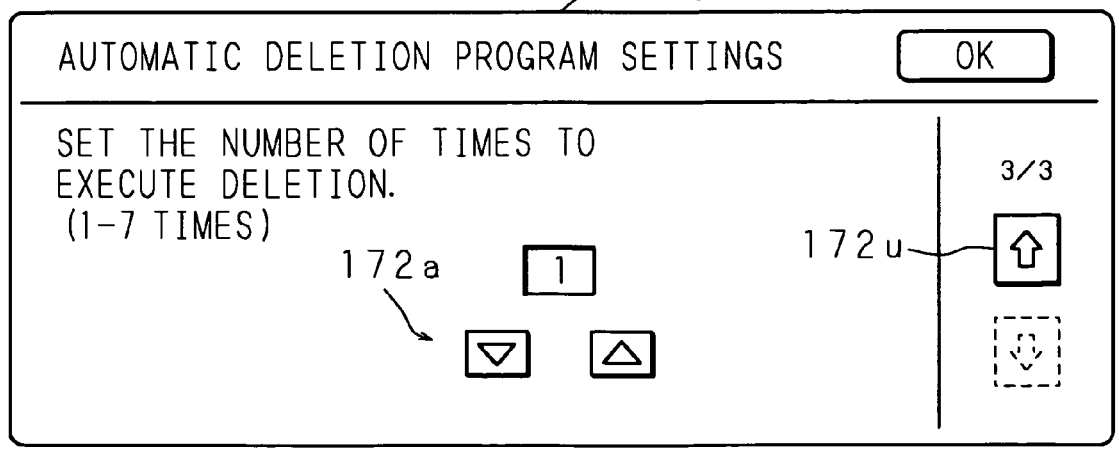

On the other hand, when the page switching button 171d is pressed, a program settings screen 172 shown in FIG. 8C is displayed. On the program settings screen 172, a number setting section 172a is provided for setting the number of times the deletion of data is to be executed at the set time. In the number setting section 172a, a button for increasing the number of times deletion is to be executed one by one, and a button for decreasing the number of times deletion is to be executed one by one are arranged. By operating these two buttons, it is possible to set the number of times to execute deletion between once and seven times. Moreover, since a page switching button 172u is provided at the right end of the program settings screen 172, the above-described program settings screen 171 can be displayed again.

Note that in this embodiment, although only the time to execute the data deletion process is set on the program settings screen 170, it may be possible to set a date or a day of the week together with the time, or it may be possible to set a plurality of deletion times.

Figure 9:
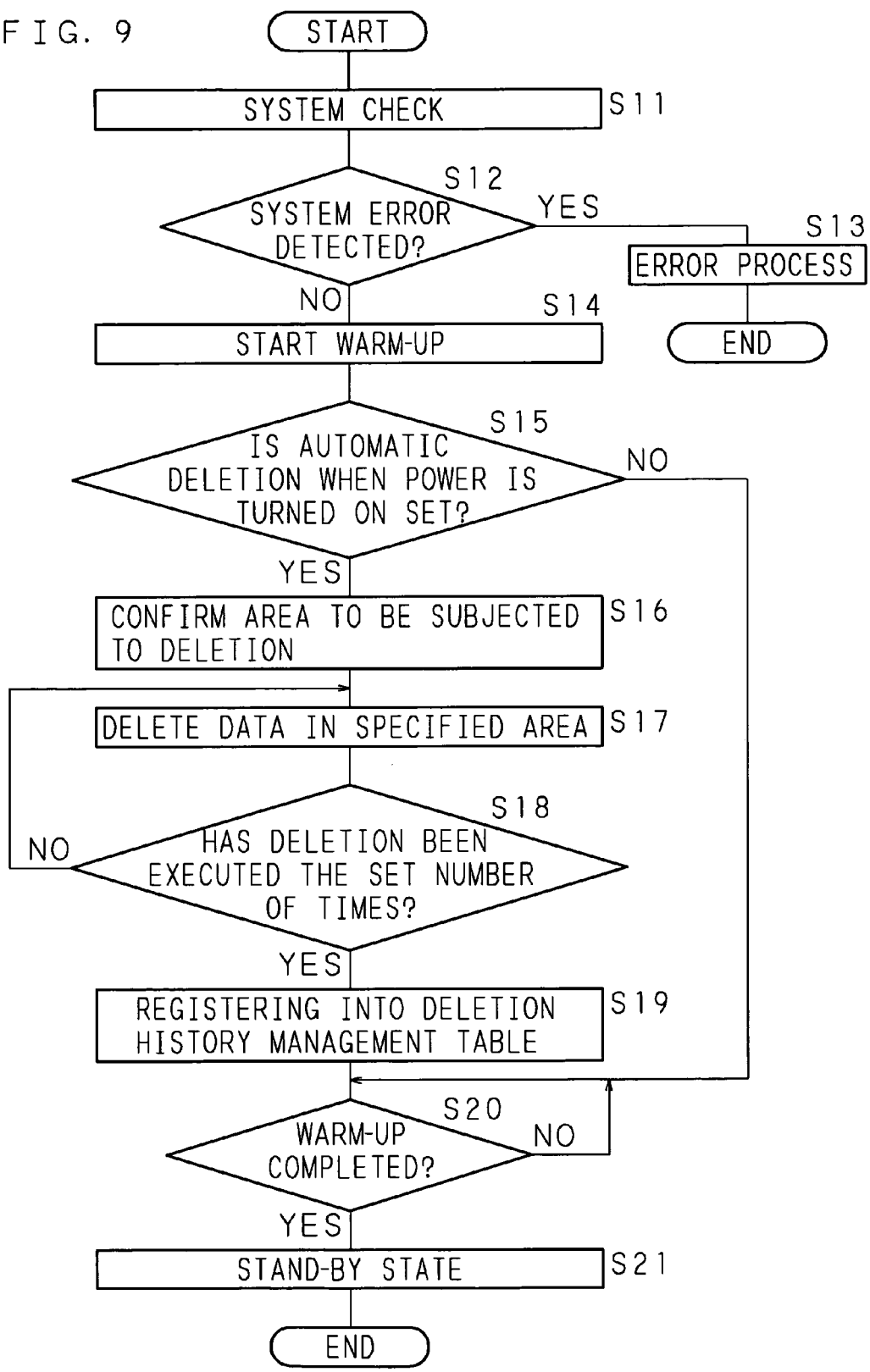

Referring to the flowchart, the following description will specifically explain the operation of the multi-function apparatus 10. FIG. 9 is a flowchart explaining the steps of a process to be executed by the multi-function apparatus 10 when power is turned on. When the power of the multi-function apparatus 10 is turned on, first, the CPU 11 of the multi-function apparatus 10 performs a system check (step S11). More specifically, the CPU 11 communicates with the respective hardware devices, obtains the information about the installed hardware devices, and detects the operating status of them. As a result of the system check, the CPU 11 determines whether or not there is abnormality in the installed hardware, that is, whether or not a system error has been detected (step S12). If the CPU 11 determines that a system error has been detected (S12: YES), then it displays an error message indicating that abnormality has been detected in the display section 100 of the operating panel 15 and performs an error handling (step S13).

As a result of the system check, if a system error has not been detected (S12: NO), the CPU 11 starts warm-up (step S14). Next, the CPU 11 determines whether or not automatic deletion when power is turned on is set on the above-described automatic deletion settings screen 160, 161 (step S15). If the CPU 11 determines that automatic deletion is set (S15: YES), it confirms the area to be subjected to deletion (step S16), and then deletes the data in the specified area (step S17). More specifically, the CPU 11 gives an instruction to write zero or random data into the area in order to invalidate the image data, etc. stored by the user. At this time, it may be possible to delete a FAT (File Allocation Table) that manages the storage location of the image data, etc.

Next, the CPU 11 determines whether or not deletion has been executed the set number of times (step S18). If the CPU 11 determines that deletion has not been executed the set number of times (S18: NO), it returns the processing to step S17 and repeats data deletion until the number of times deletion has been executed reaches the set number. In the case where random data is to be written to delete data, it may be possible to generate new random data and write the generated random data every time deletion is repeated.

If the CPU 11 determines that deletion has been executed the set number of times (S18: YES), it registers the information, such as the date and time of deletion, the area subjected to deletion and the number of times deletion has been performed, in the deletion history management table 14a (step S19). FIG. 10 is a concept view showing an example of the deletion history management table 14a. In the deletion history management table 14a, the date and time when data deletion is completed, the deletion instruction, the area subjected to deletion, the status and the number of times deletion has been performed are stored in association with each other. For example, the first record in the deletion history management table shown in FIG. 10 indicates that the data in all areas of the HDD device 21 has been deleted when power is turned on (Jan. 30, 2004, 8:07). The second record indicates that the data in the work area 21a of the HDD device 21 has been deleted at the deletion time (12:00) set on the above-described program settings screen 170. Further, the third record indicates that the data in the work area 21a has been deleted manually through the above-described data area deletion screen 150. Other records also indicate similar contents.

When the registration into the deletion history management table 14a has been completed, or when the CPU 11 determines in step S15 that automatic deletion when power is turned on is not set (S15: NO), then the CPU 11 determines whether or not warm-up started in step S14 has been completed (step S20). If the CPU 11 determines that warm-up has not been completed (S20: NO), it waits until warm-up is completed. Then, if the CPU 11 determines that warm-up has been completed (S20: YES), it moves into a standby state for receiving various kinds of jobs (step S21).

Figure 11:
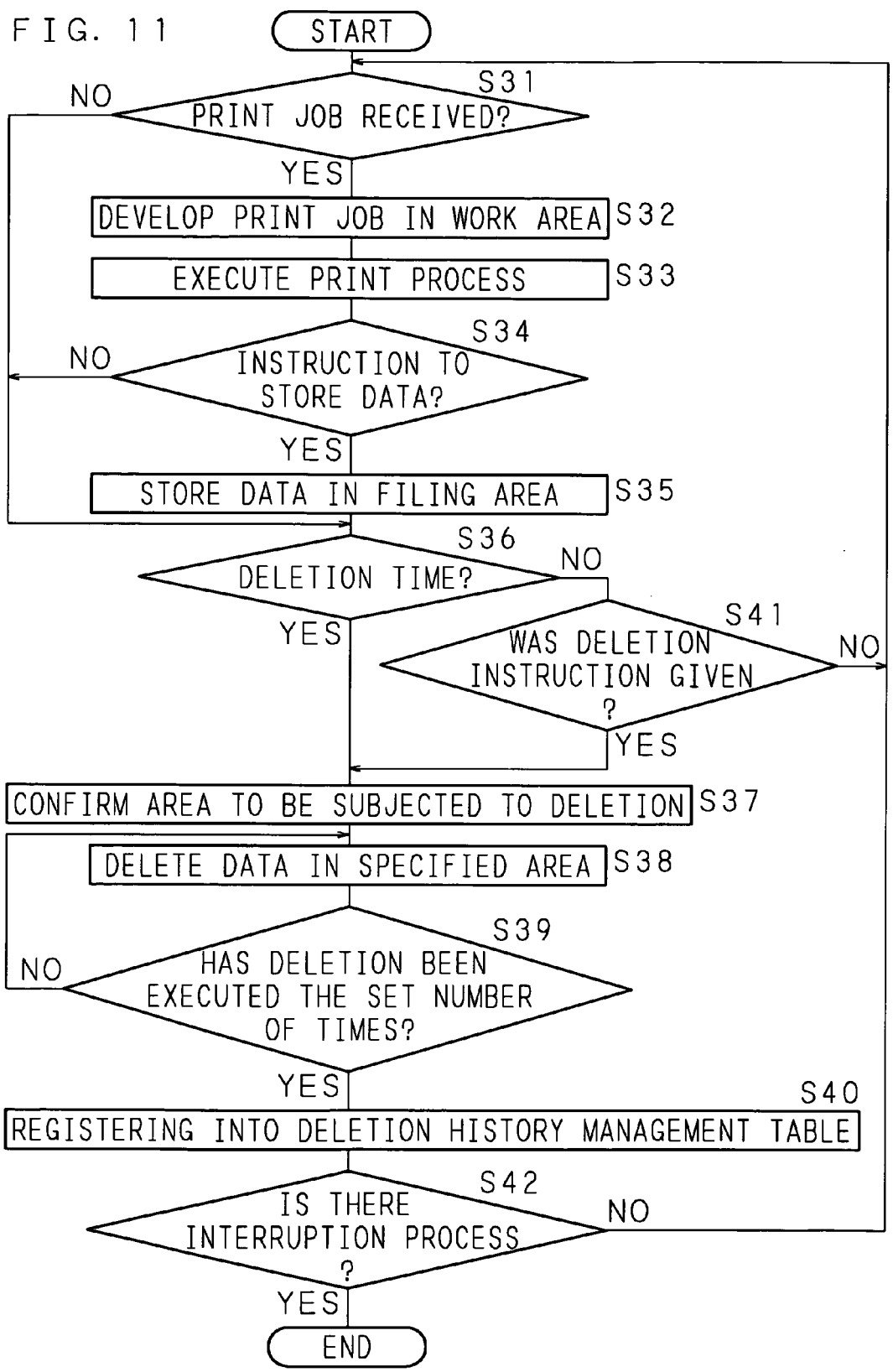
FIG. 11 is a flowchart explaining the steps of a process to be executed by the multi-function apparatus after turning on power.

FIG. 11 is a flowchart explaining the steps of a process to be executed by the multi-function apparatus 10 after turning on power. The CPU 11 of the multi-function apparatus 10 determines whether or not a print job has been received (step S31). If the CPU 11 determines that a print job has been received (S31: YES), it develops the print job in the work area 21a of the HDD device 21 (step S32), and executes the print process by transmitting image data obtained by developing the print job to the image forming section 17 via the image memory 20 (step S33). Then, the CPU 11 determines whether or not the print job instructs the apparatus to store the data (step S34). If the CPU 11 determines that the print job instructs the apparatus to store the data (S34: YES), it stores the data (image data) in the filing area 21b of the HDD device 21 (step S35).

When the data is stored in the filing area 21b, or when the CPU 11 determines in step S34 that the print job does not instruct the apparatus to store the data (S34: NO), or when the CPU 11 determines in step S31 that no print job has been received (S31: NO), then the CPU 11 makes reference to the output of clock means (not shown) and determines whether or not the current time is the deletion time set on the above-described program settings screen 170 (step S36). If the CPU 11 determines that the current time is the deletion time (S36: YES), it confirms the area specified on the program settings screen 171 for deletion (step S37), and deletes the data in the specified area (step S38). Data deletion is performed by invalidating the data such as image data by writing zero or random data into the area.

Next, the CPU 11 determines whether or not deletion has been executed the set number of times (step S39). If the CPU 11 determines that deletion has not been executed the set number of times (S39: NO), it returns the processing to step S38 and repeats data deletion until the number of times deletion has been executed reaches the set number. If the CPU 11 determines that deletion has been executed the set number of times (S39: YES), it registers the information, such as the date and time of deletion, the area subjected to deletion and the number of times deletion has been performed, in the deletion history management table 14a (step S40).

On the other hand, in step S36, if the CPU 11 determines that the current time is not the deletion time (S36; NO), it determines whether or not a deletion instruction has been given through the data area deletion screen 150 shown in FIG. 6A, 6B (step S41). If the CPU 11 determines that there is no deletion instruction (S41: NO), it returns the processing to step S31, while if the CPU 11 determines that there is a deletion instruction (S41: YES), it performs the processing from step S37 to step S40 to complete the deletion process.

After registering the information in the deletion history management table 14a, the CPU 11 determines whether or not there is an interruption process caused by turning off power to the entire apparatus, or resetting (step S42). If the CPU 11 determines that there is no interruption process (S42: NO), it returns the processing to step S31, while if the CPU 11 determines that there is an interruption process (S42: YES), it completes the processing of this routine.

Thus, deletion of the data stored in the HDD device 21 is performed when the power of the multi-function apparatus 10 is turned on, or at the time specified by the user, or according to the user's instruction, and this embodiment enables issuance of a certificate to prove that the data has been deleted. On the user settings screen 110 shown in FIG. 4A, when a Deletion History Display button 112 is pressed, a deletion history display screen 180 as shown in the schematic view of FIG. 12 is displayed in the display section 100 of the operating panel 15. On the deletion history display screen 180, the records registered in the deletion history management table 14a are displayed three records at a time. When a page switching button 180u or 180d located at the right end of the screen is pressed, other three records are displayed. The display positions of the respective records correspond to record select buttons 180a, 180b and 180c composed of software keys, and one record can be selected from among the displayed three records.

Moreover, in the lower area of the deletion history display screen 180, a Delete button 180e, a Print button 180f, and a Certificate button 180g are arranged for deleting a record, printing a deletion history, and issuing a certificate, respectively.

Figure 13A:
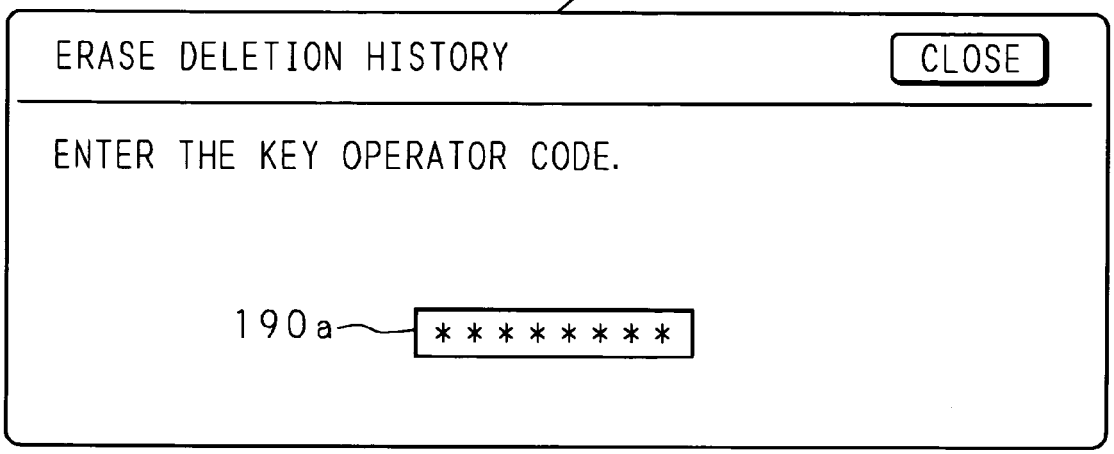
FIGS. 13A and 13B are schematic views showing examples of screens displayed when deleting a record.
Figure 13B:
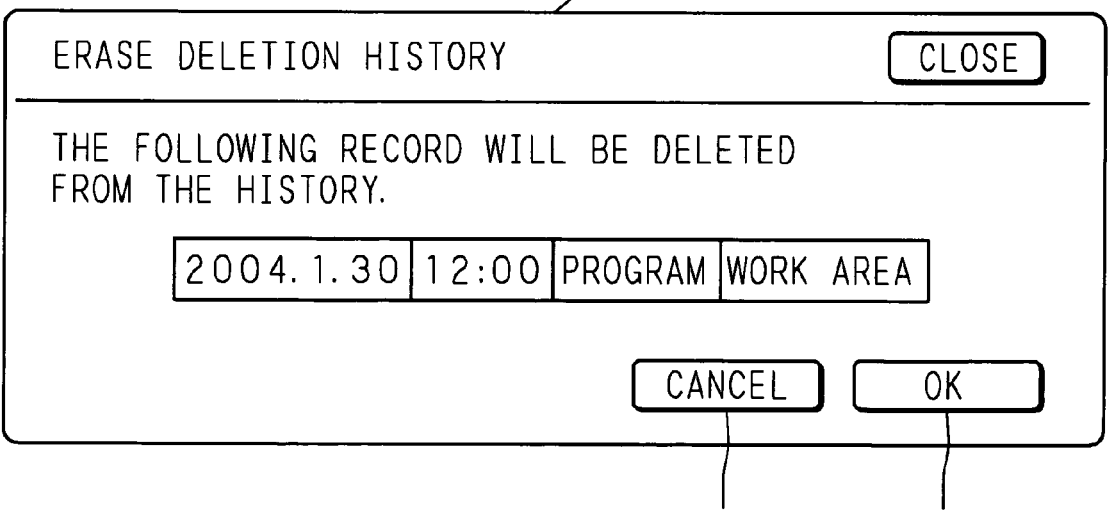

FIGS. 13A and 13B are schematic views showing an example of a screen displayed when deleting a record. On the deletion history display screen 180, when one record select button 180a (or 180b or 180c) is pressed and subsequently the Delete button 180e is pressed, a code reception screen 190 for receiving a key operator code as shown in FIG. 13A is displayed. A code input box 190a is provided in the vicinity of the center of the code reception screen 190 to receive an input of key operator code by the key operator. When an input of key operator code is received, as shown in FIG. 13B, a confirmation screen 191 for confirmation of deletion of the record is displayed. On the confirmation screen 191, a Cancel button 191a and an OK button 191b are provided. When the Cancel button 191a is pressed, deletion of the record is cancelled, while when the OK button 191b is pressed, a specified record is deleted from the deletion history management table 14a.

FIG. 14 is a schematic view showing an output example of a deletion history. When a Print button 180f on the deletion history display screen 180 is pressed, an image showing a list of records registered in the deletion history management table 14a is generated, information that proves the propriety of these records is added to the image, and then the image is printed out. The information that proves the propriety of the records includes the name and serial number of the multi-function apparatus 10, and a predetermined mark. In the example shown in FIG. 14, a list of records is printed on the center of output paper, the name and serial number of the multi-function apparatus 10 are printed on the above the list, and the predetermined mark is printed below the list.

FIG. 15 and FIG. 16 are schematic views showing examples of certificates issued by the multi-function apparatus 10. Although FIG. 14 shows a list of records, it may also be possible to issue a certificate for each record. On the deletion history display screen 180 shown in FIG. 12, when one record select button 180a (or 180b or 180c) is pressed and subsequently the Certificate button 180g is pressed, a certificate as shown in FIG. 15 and FIG. 16 is issued. Issuance of the certificate is carried out by printing the time and date of data deletion, the text certifying that the data has been deleted, the name and serial number of the multi-function apparatus 10, and a predetermined mark on paper. In the example shown in FIG. 15, it is certified that the data in the work area 21a has been deleted on Jan. 30, 2004; 14:17, while in the example shown in FIG. 16, it is certified that all data in the hard disk (HDD device 21) has been deleted on Feb. 2, 2004; 8:12.

Thus, in this embodiment, when the data stored in the HDD device 21 that is storage means is deleted (invalidated), this fact is managed as a history, and the fact that the data has been deleted is proved. Therefore, even when handling personal information, the user can use the multi-function apparatus 10 without anxiety.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A data processing apparatus comprising:
a storage section for storing received data; and
a controller performing operations of:
processing the received data;
performing an invalidation process on the data stored in the storage section;
generating a record showing history information that relates to a performed condition of the invalidation process after completion of the invalidation process;
storing the generated record in a history management table;
forming on a display screen a history information list configured with a plurality of records stored in the history management table;
displaying a plurality of select buttons each of which corresponds to one of the plurality of records displayed on the display screen;
and
issuing a certificate for proving propriety of the record corresponding to a selected one of the select buttons.

2. The data processing apparatus according to claim 1, wherein
said storage section has a plurality of storage areas, and
said controller is further capable of performing an operation of receiving a selection of a storage area to be subjected to the invalidation process,
wherein the invalidation process is performed on the data in the selected storage area.

3. The data processing apparatus according to claim 1, wherein said controller is further capable of performing operations of:
receiving a condition for performing the invalidation process; and
determining whether or not the received condition is satisfied,
wherein the invalidation process is performed on the data, when said controller determines that the condition is satisfied.

4. The data processing apparatus according to claim 1, wherein said controller is further capable of performing operations of:
outputting time information; and
determining, based on the outputted time information, whether it is a predetermined time or not,
wherein the invalidation process is performed on the data, when said controller determines that it is the predetermined time.

5. The data processing apparatus according to claim 1, wherein said controller is further capable of performing operations of:
receiving an instruction to delete the a deletion record of the plurality of records;
receiving identification information for identifying a user when the instruction is received;
authenticating the user based on the received identification information;
deciding whether or not to delete the deletion record, based on an authentication result; and
deleting the deletion record when the decision is made to delete the history information.

6. An image forming apparatus comprising:
a storage section for storing received image data; and
a controller performing operations of:
forming an image on a sheet based on the received image data;
performing an invalidation process on the image data stored in the storage section;
generating a record showing history information that relates to a performed condition of the invalidation process after completion of the invalidation process; and storing the generated record in a history management table in the storage section;

forming on a display screen a history information list configured with a plurality of records stored in the history management table;

displaying a plurality of select buttons each of which corresponds to one of the plurality of records displayed on the display screen; and issuing a certificate for proving propriety of the record corresponding to a selected one of the select buttons.

7. A data processing apparatus comprising:

means for processing received data;

storage means for storing the data;

means for performing an invalidation process on the data stored in the storage means;

means for generating a record showing history information that relates to a performed condition of the invalidation process after completion of the invalidation process; and means for forming on a display screen a history information list configured with a plurality of records stored in the history management table;

means for storing the generated record in a history management table;

means for displaying a plurality of select buttons each of which corresponds to one of the plurality of records displayed on the display screen; and means for issuing a certificate for proving propriety of the record corresponding to a selected one of the select buttons.

8. The data processing apparatus according to claim 7, wherein said storage means has a plurality of storage areas, and the apparatus further comprises means for receiving a selection of a storage area to be subjected to the invalidation process, wherein the invalidation process is performed on the data in the selected storage area.

9. The data processing apparatus according to claim 7, further comprising:

means for receiving a condition for performing the invalidation process; and means for determining whether or not the received condition is satisfied, wherein the invalidation process is performed on the data, when said means determines that the condition is satisfied.

10. The data processing apparatus according to claim 7, further comprising:

means for outputting time information; and means for determining, based on the time information outputted by said means, whether it is a predetermined time or not, wherein if said means determines that it is the predetermined time, the invalidation process is performed on the data.

11. The data processing apparatus according to claim 7, further comprising:

means for receiving an instruction to delete a deletion record of the plurality of records;

means for receiving identification information for identifying a user when the instruction is received;

means for authenticating the user based on the received identification information;

means for deciding whether or not to delete the deletion record, based on a result of authentication performed by said means; and means for deleting the deletion record when said means decides to delete the deletion record.

12. An image forming apparatus comprising:

means for forming an image on a sheet based on received image data;

storage means for storing the image data;

means for performing an invalidation process on the image data stored in the storage means;

means for generating a record showing history information that relates to a performed condition of the invalidation process after completion of the invalidation process; and means for storing the generated record in a history management table;

means for forming on a display screen a history information list configured with a plurality of records stored in the history management table;

means for displaying a plurality of select buttons each of which selects one of the plurality of records displayed on the display screen; and means for issuing a certificate for proving propriety of the record corresponding to the selected one of the select buttons.

* * * * *